United States Patent
Clark

(10) Patent No.: US 7,516,068 B1
(45) Date of Patent: Apr. 7, 2009

(54) OPTIMIZED COLLECTION OF AUDIO FOR SPEECH RECOGNITION

(75) Inventor: Michael C. Clark, Fleet (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/098,521

(22) Filed: Apr. 7, 2008

(51) Int. Cl.
*G10L 15/00* (2006.01)

(52) U.S. Cl. .................... 704/231; 704/270; 704/270.1; 704/275

(58) Field of Classification Search ................. 704/231, 704/270, 270.1, 275
See application file for complete search history.

(56) References Cited

U.S. PATENT DOCUMENTS

| | | | |
|---|---|---|---|
| 6,839,670 B1 * | 1/2005 | Stammler et al. | ........... 704/251 |
| 6,889,191 B2 | 5/2005 | Rodriguez et al. | |
| 6,978,159 B2 * | 12/2005 | Feng et al. | ................... 455/570 |
| 2003/0187646 A1 | 10/2003 | Smyers et al. | |
| 2005/0033571 A1 * | 2/2005 | Huang et al. | ................ 704/231 |

* cited by examiner

*Primary Examiner*—Qi Han
(74) *Attorney, Agent, or Firm*—Suiter Swantz pc llo

(57) ABSTRACT

A method for audio collection and speech recognition includes providing a plurality of listening devices, the listening devices including at least one microphone capsule, a signal pre-amplifier, a processor, and a transmitter/receiver; placing the plurality of listening devices throughout a geographic area; capturing audio by at least one of the plurality of listening devices; receiving a report from a listening device regarding a level-of-audibility of captured audio; comparing a signal strength of a signal received by two or more listening devices; ranking detected signals from two or more listening devices; selecting an optimal signal from the captured audio; and transferring the optimal audio signal from a listening device receiving the optimal audio signal to a consuming device via a network.

6 Claims, 2 Drawing Sheets

US 7,516,068 B1

OPTIMIZED COLLECTION OF AUDIO FOR SPEECH RECOGNITION

TECHNICAL FIELD

The present disclosure generally relates to the field of audio recording, and more particularly to a system and method of audio collection for speech recognition.

BACKGROUND

Speech recognition technology generally converts spoken words to machine-readable input. Speech recognition applications include voice dialing, call routing, content-based spoken audio search, data entry, preparation of structured documents, and speech-to-text processing.

SUMMARY

A system for audio collection and speech recognition includes, but is not limited to: at least one consuming device operable via speech recognition; and a plurality of listening devices, at least one of the plurality of listening devices including: a plurality of microphone capsules, the plurality of microphone capsules arranged in opposing directions, and utilized to determine the relative direction of a speaker to the listening device; a signal pre-amplifier including: an adjustable input gain, and circuitry to optimize an amplification of a signal to provide an optimal signal-to-noise ratio; a processor including: an amount of processing power adequate to calculate signal quality and loudness of a detected signal; circuitry configured to permit group voting among the plurality of listening devices to determine which of the plurality of listening devices is selected to perform a task, circuitry to determine a target consuming device, and circuitry to direct the at least one consuming device to prompt a speaker for clarification; and a transmitter-receiver configured to receive information from at least one of the plurality of listening devices and transmit a signal to the at least one consuming device operable via speech recognition, at least one of the plurality of listening devices configured to receive location information of at least one other of the plurality of listening devices relative to a geographical environment within which the at least one and the at least one other of the plurality of listening devices is positioned.

A method for audio collection and speech recognition includes, but is not limited to: providing a plurality of listening devices, the listening devices including at least one microphone capsule, a signal pre-amplifier, a processor, and a transmitter/receiver; placing the plurality of listening devices throughout a geographic area; capturing audio by at least one of the plurality of listening devices; receiving a report from a listening device regarding a level-of-audibility of captured audio; comparing a signal strength of a signal received by two or more listening devices; ranking detected signals from two or more listening devices; selecting an optimal signal from the captured audio; and transferring the optimal audio signal from a listening device receiving the optimal audio signal to a consuming device via a network.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
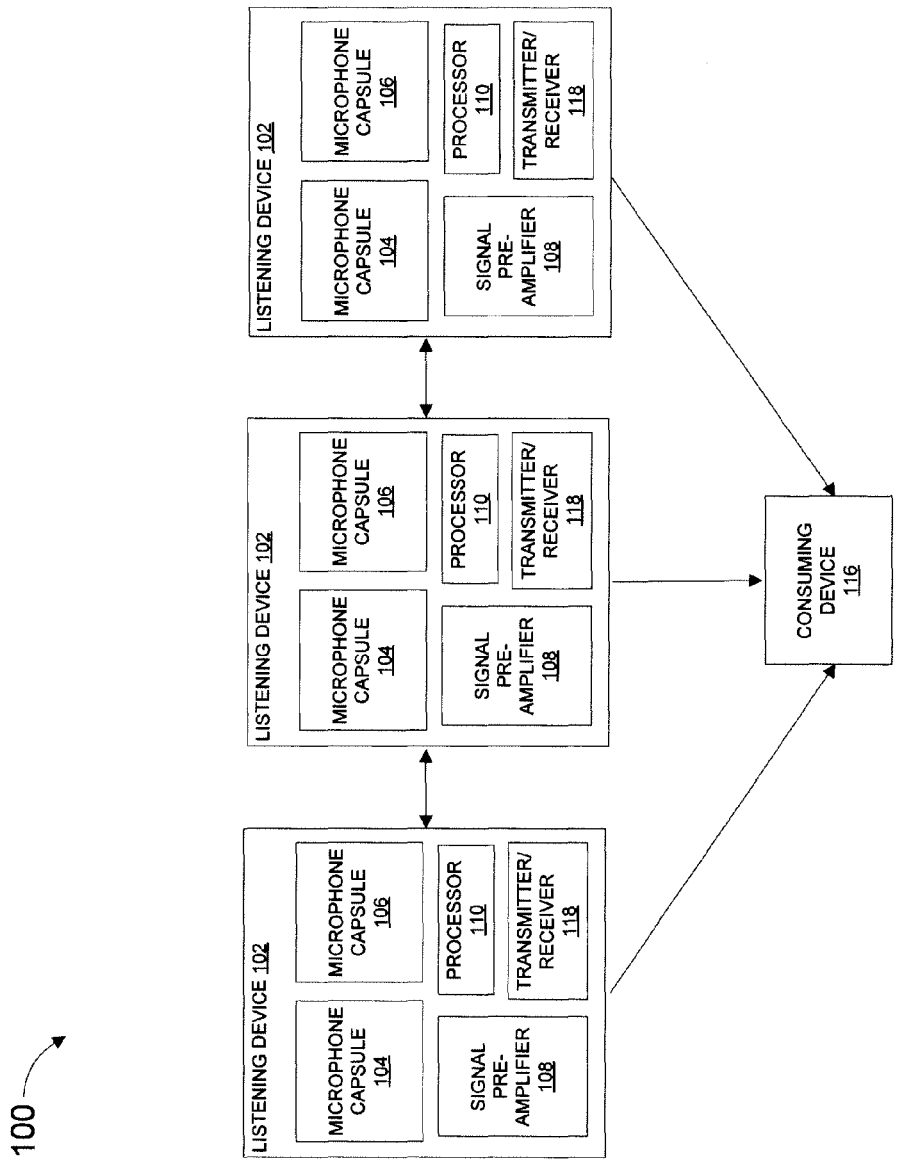
FIG. 1 is a schematic diagram illustrating a system for communication between multiple listening devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to FIG. 1, a schematic diagram illustrating a system 100 for communication between multiple listening devices is shown. System 100 may comprise a plurality of listening devices 102. At least one of the listening devices 102 may include at least one microphone capsule 104 and/or 106, a signal pre-amplifier 108 and a processor 110. Microphone capsules 104 may be arranged in opposing directions, and may be utilized to determine the relative direction of the speaker to the listening device 102. This may also assist with clarification of natural language context and help with separation and identification of multiple speakers in the same environment. Signal pre-amplifier 108 may include an adjustable input gain, and processor 110 may include an amount of processing power adequate to calculate signal quality and loudness of a detected signal. Listening devices 102 may also include at least one transmitter/receiver 118 configured to receive information from at least one other listening device 102 and transmit a signal to at least one consuming device 116.

Listening devices 102 may be aware of each other and aware of at least one other listening device geographical location relative to an environment within which the listening devices 102 are positioned. Listening devices 102 may include circuitry configured to permit group voting among the listening devices 102 to determine which of the plurality of listening devices may perform a task. Listening devices 102 may also determine the target consuming device 116 (e.g., which speech recognition consuming device available in the environment) for a spoken command. At least one of the listening devices 102 may transmit a signal to the consuming device 116, and all other listening devices 102 may be prevented from transmitting a signal to the consuming device 116. In the case where none of the listening devices 102 are able to receive and/or transmit a valid recognition, at least one of the listening devices 102 may determine which of the consuming devices 116 may be directed to prompt a speaker for clarification.

At least one of listening devices 102 may be configured to capture spoken commands as a source to consuming speech recognition systems. A listening device 102 may then transmit the audio and supporting qualitative information onwards to a consuming device 116 via the transmitter/receiver 118. Listening devices 102 may be independent of the consuming device 116 and may be installed or placed specifically within a physical environment in any configuration. The listening devices may also include sufficient intelligence to optimize the amplification of the audio signal to offer an optimal signal-to-noise ratio. For instance, listening devices may include an embedded real time software system configured to interact with the environment within which the listening device is placed.

Figure 2:
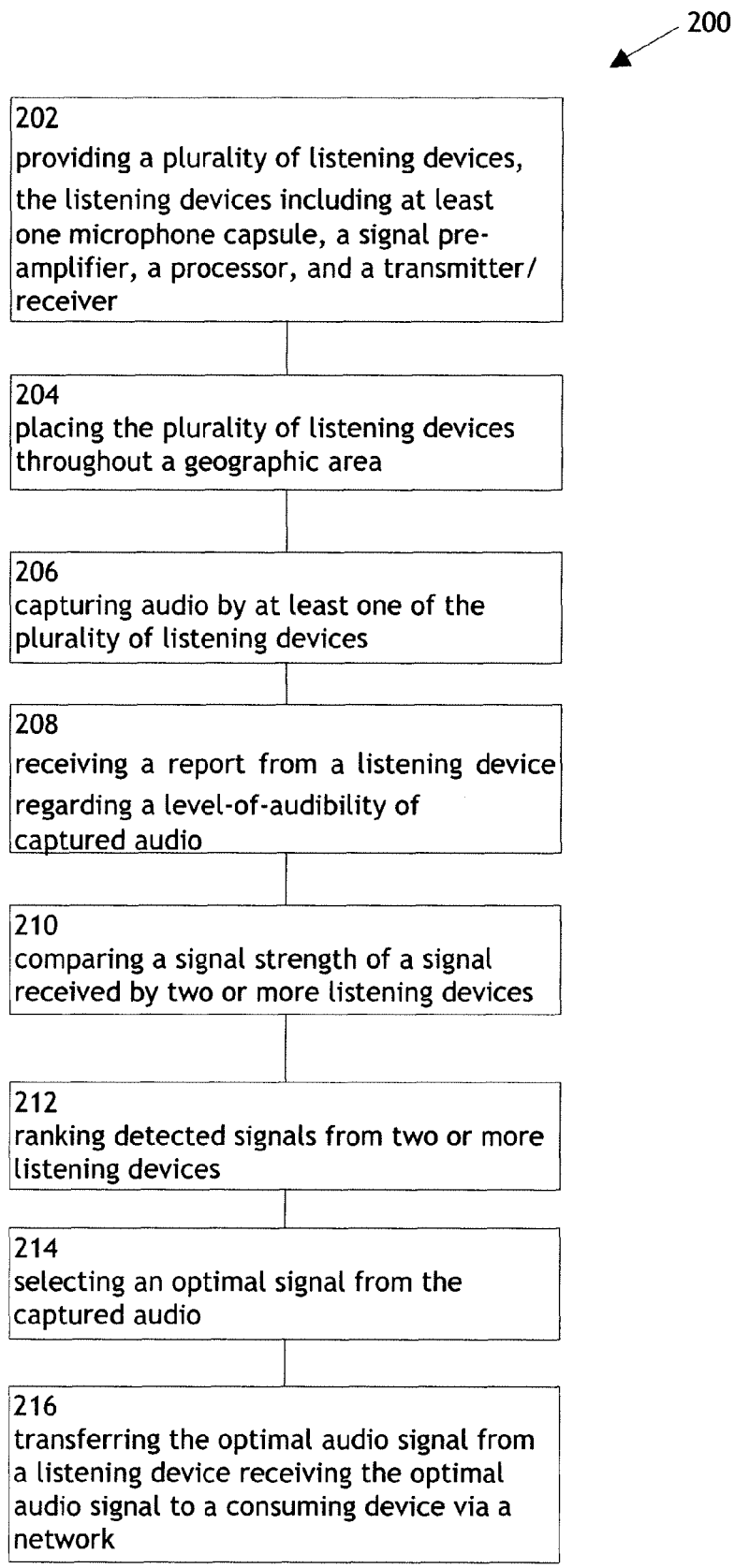
FIG. 2 is flow diagram illustrating a method for communication between multiple listening devices.

FIG. 2 illustrates an operational flow of a method 200 representing example operations related to FIG. 1. In FIG. 2 and in following figures that include various examples of operational flows, discussion and explanation may be provided with respect to the above-described examples of FIG. 1 and/or with respect to other examples and contexts. However, it should be understood that the operational flows may be executed in a number of other environments and contexts, and/or in modified versions of FIG. 1. Also, although the various operational flows are presented in the sequence(s) illustrated, it should be understood that the various operations may be performed in other orders than those which are illustrated, or may be performed concurrently.

Method 200 may comprise providing a plurality of listening devices, the listening devices including at least one microphone capsule, a signal pre-amplifier, a processor, and a transmitter/receiver 202. Method 200 may comprise placing the plurality of listening devices throughout a geographic area 204. Method 200 may further comprise capturing audio by at least one of the plurality of listening devices 206. For instance, a listening device (e.g., 102 of FIG. 1) may capture audio detected within the listening device detection range.

Method 200 may receive a report from a listening device regarding a level-of-audibility of captured audio 208. Method 200 may utilize the report to determine which of the plurality of listening devices in the geographic area is in closest proximity to a speaker. It is contemplated that the speaker may move within the geographic area, and therefore the method 200 may receive the report at periodic intervals and may alter a listening device proximity determination, providing a reselection of the optimal signal and transfer from one listening device to the listening device determined to be the optimal source. Method may include comparing a signal strength of a signal received by two or more listening devices 210, and ranking detected signals from two or more listening devices 212. Method 200 may select an optimal signal from the captured audio, such as a signal from the closest or optimal quality source 214.

Method 200 may comprise analyzing the listening device level of quality report and determining an inclusion or exclusion of the listening device based on the analysis. For instance, a listening device may report a level-of-quality, which may be utilized to include or exclude the listening device from the voice recognition process. Method 200 may further comprise preventing a speech recognition attempt in an environment including one or more sound impedances. Specifically, a voice recognition attempt may be prevented where the acoustic environment may prevent an accurate voice recognition detection. For example, if a listening device is located in a kitchen where other equipment such as a dishwasher might create excessive noise for periods of time, rendering any audio during this period would have no value. The listening device may report an environmental sound impedance and report the environmental sound impedance to the control device for use when reselecting an optimal signal source from another listening device.

Method 200 may further comprise placing a listening device in a configuration mode. For instance, a listening device may be equipped to be placed into a configuration mode, where the listening device proximity to the other listening devices may be established and transmitted to the consuming device. Method 200 may also include providing a statistical map of local listening devices. Method 200 may include receiving identifier information from one or more listening devices. For instance, the listening devices may be uniquely or geographically identifiable to provide speaker location information relative to the listening device. Location information may be detected and transferred to a consuming device (e.g., 116 of FIG. 1) to resolve a spoken command, such as to turn on a specific light. Method 200 may include determining which of the listening devices (e.g., the requested light in this instance) is within the closest proximity to a speaker based on the spoken command. Continuing the example, received proximity to other listening device measurements may be utilized to provide a statistical map of local listening devices which may improve the reselecting of an optimal signal source from another listening device.

Method 200 may include transferring an optimal audio signal from a listening device receiving the optimal audio signal to a consuming device via a network 216. Continuing the example above, following a selection of an optimal signal source, the listening device receiving the optimal audio signal may transmit the audio signal to a consuming device via an existing network technology, such as TCP/IP or Wireless 802.11.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An audio collection system for speech recognition comprising:
    at least one consuming device operating via speech recognition; and
    a plurality of listening devices connected within a network,
        at least one of the plurality of listening devices including:
            a plurality of microphone capsules, the plurality of microphone capsules arranged in opposing directions, and utilized to determine the relative direction of a speaker to the listening device;
            a signal pre-amplifier including:
                an adjustable input gain, and
                circuitry to optimize an amplification of a signal to provide an optimal signal-to-noise ratio;
            a processor including:
                an amount of processing power adequate to calculate signal quality and loudness of a detected signal;
                circuitry configured to permit group voting among the plurality of listening devices to determine which of the plurality of listening devices that received an audio signal at the same time is selected to perform a transmitting task, circuitry to determine a target consuming device, and circuitry to direct the at least one consuming device to prompt a speaker for clarification; and a transmitter-receiver configured to receive information from at least one of the plurality of listening devices and transmit the audio signal from the selected device to the at least one consuming device operating via speech recognition, at least one of the plurality of listening devices configured to receive location information of at least one other of the plurality of listening devices relative to a geographical environment within which the at least one and the at least one other of the plurality of listening devices is positioned wherein said at least one consuming device further comprises operating the recognized result as a spoken command from received audio signal.

2. A method for collecting and transferring audio for speech recognition comprising:

providing a plurality of listening devices connected within a network, the listening devices including at least one microphone capsule, a signal pre-amplifier, a processor, and a transmitter/receiver;

placing the plurality of listening devices throughout a geographic area;

capturing an audio signal by two or more of the plurality of listening devices at the same time;

receiving a report on one of the plurality of listening devices: regarding a level-of-audibility of the captured audio signal from each of the two or more of the plurality of listening devices;

comparing signal strengths of the audio signal received by the two or more listening devices;

ranking detected signals from two or more listening devices;

selecting an optimal signal from the captured and ranked audio signals for the two or more listening devices; and transferring the optimal audio signal from a listening device receiving the optimal audio signal to a consuming device via the network for speech recognition, wherein the consuming device further comprises operating recognized result as a spoken command from received audio signal.

3. The method of claim 2, further including:

placing a listening device in a configuration mode to determine listening device proximity to at least one other listening device.

4. The method of claim 2, further including:

analyzing a listening device level of quality report and determining an inclusion or exclusion of the listening device based on the analysis.

5. The method of claim 2, further including:

preventing a speech recognition attempt in an environment including one or more sound impedances.

6. The method of claim 2, further including:

providing a statistical map of local listening devices;

receiving identifier information from the plurality of listening devices; and determining which of a set of consuming devices is within the closest proximity to a speaker based on a spoken command.

* * * * *